(12) United States Patent
Marcolino Quintao Severgnini et al.

(10) Patent No.: US 12,032,770 B2
(45) Date of Patent: Jul. 9, 2024

(54) HAPTIC ARRAY DEVICE AND CONTROL OF FOCUS POINT HEIGHT AND FOCUS POINT DIRECTION

(71) Applicant: Toyota Motor Engineering & Manufacturing North America, Inc., Plano, TX (US)

(72) Inventors: Frederico Marcolino Quintao Severgnini, Ann Arbor, MI (US); Ercan Mehmet Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/163,865

(22) Filed: Feb. 1, 2021

(65) Prior Publication Data
US 2022/0164079 A1    May 26, 2022

Related U.S. Application Data

(60) Provisional application No. 63/117,103, filed on Nov. 23, 2020.

(51) Int. Cl.
*G06F 3/01*     (2006.01)
*G06F 3/039*    (2013.01)
*G06F 3/041*    (2006.01)

(52) U.S. Cl.
CPC ........ *G06F 3/04144* (2019.05); *G06F 3/0393* (2019.05); *G06F 3/04146* (2019.05)

(58) Field of Classification Search
CPC ............... G06F 3/04144; G06F 3/0393; G06F 3/04146; G06F 3/016; G06F 3/017;
(Continued)

(56) References Cited

U.S. PATENT DOCUMENTS 6,719,694 B2   4/2004   Weng et al.
7,756,246 B2   7/2010   Mikami et al.
(Continued)

FOREIGN PATENT DOCUMENTS

DE   102016210214 A1   12/2017
JP        3706899 B2   10/2005
(Continued)

*Primary Examiner* — Lunyi Lao
*Assistant Examiner* — Jarurat Suteerawongsa
(74) *Attorney, Agent, or Firm* — Dinsmore & Shohl LLP

(57) ABSTRACT

Systems and methods are provided for ultrasonic haptic array devices. One embodiment of haptic array device includes a plurality of cells, each cell including a base and an array of ultrasonic transducer elements, and a support structure configured to independently position each cell. A controller of the haptic array can control a focus point and a direction of ultrasonic output for each of the plurality of cells. Another embodiment is directed to a vehicle user interface having a user interface surface and a haptic array device integrated with the user interface surface. Embodiments are also directed to methods for controlling a haptic array device. One method includes controlling output of at least one first cell of the plurality of cells to control a focus point and a direction of ultrasonic output of the at least one cell, and updating output of the plurality of cells.

17 Claims, 5 Drawing Sheets

(58) Field of Classification Search
CPC .. G06F 3/04815; G06F 2203/014; G06F 3/04; G10K 11/346; G10K 15/00
See application file for complete search history.

(56) References Cited

U.S. PATENT DOCUMENTS

| | | | |
|---|---|---|---|
| 8,649,242 | B2 | 2/2014 | Martin et al. |
| 8,880,141 | B2 | 11/2014 | Chen |
| 8,912,709 | B2 | 12/2014 | Pollock et al. |
| 10,168,782 | B1* | 1/2019 | Tchon ................... G06F 3/016 |
| 11,048,329 | B1* | 6/2021 | Lee ......................... G06F 3/011 |
| 2012/0081337 | A1* | 4/2012 | Camp, Jr. ............. G06F 3/0436 |
| | | | 345/177 |
| 2014/0316269 | A1 | 10/2014 | Zhang et al. |
| 2015/0331488 | A1* | 11/2015 | Grant ..................... G06F 3/014 |
| | | | 715/702 |
| 2016/0246374 | A1 | 8/2016 | Carter et al. |
| 2017/0123499 | A1 | 5/2017 | Eid |
| 2017/0153707 | A1 | 6/2017 | Subramanian et al. |
| 2018/0001113 | A1 | 1/2018 | Streeter |
| 2018/0132825 | A1 | 5/2018 | Tachibana |
| 2018/0151035 | A1* | 5/2018 | Maalouf ................. G08B 6/00 |
| 2019/0041986 | A1* | 2/2019 | Rihn ....................... G06F 3/016 |
| 2019/0197842 | A1 | 6/2019 | Long et al. |
| 2020/0179168 | A1 | 6/2020 | Kelleher et al. |
| 2021/0162457 | A1* | 6/2021 | Ebefors ................. G10K 15/00 |
| 2022/0012458 | A1* | 1/2022 | Uetabira ................. G06F 3/016 |

FOREIGN PATENT DOCUMENTS

| | | |
|---|---|---|
| JP | 4576281 B2 | 11/2010 |
| JP | 2019101988 A | 6/2019 |

* cited by examiner

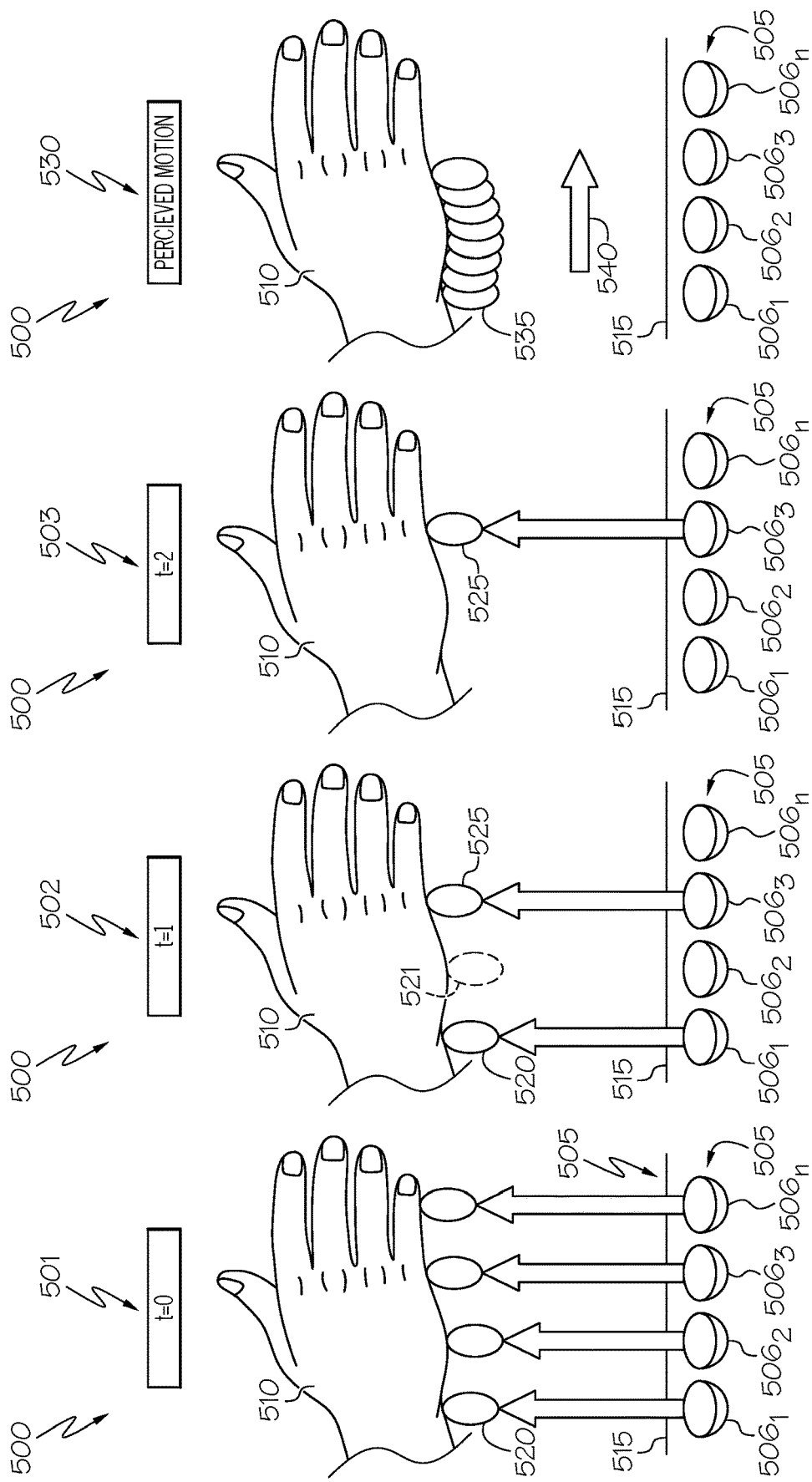

ND CONTROL
HAPTIC ARRAY DEVICE AND CONTROL OF FOCUS POINT HEIGHT AND FOCUS POINT DIRECTION

CROSS-REFERENCE TO RELATED APPLICATION

This application claims priority to U.S. Provisional Patent Application No. 63/117,103 filed Nov. 23, 2020, for "Haptic Array Device And Control Of Focus Point Height And Focus Point Direction," which is hereby incorporated by reference in its entirety including the drawings.

TECHNICAL FIELD

Embodiments described herein generally relate to ultrasonic transducer arrays and, more specifically, to haptic array devices with independent control of cells including control of focus point height and focus point direction for transducer output.

BACKGROUND

Some existing haptic arrays utilize transducers mounted to a flat surface. These haptic devices and other existing configurations can be controlled to output a haptic response. However, these existing haptic devices do not always provide a suitable output. By way of example, one drawback of conventional systems may be unintentional formation of parasitic output points (e.g., unintentional transducer output). Existing devices may generate output in a specific location and also generate parasitic output points in other locations different from the desired output point. These parasitic outputs are common for users to notice. Unintentional output may be generated surrounding a device as well. These unintentional effects may be due to undesired constructive interference of ultrasound at other regions of space. Another drawback of the existing array configurations may be weak tactile output where stimulation generated is often perceived as too weak. There is a desire for improved haptic array configurations. There also exists a need for an improved output of haptic array devices.

SUMMARY

Systems and methods for haptic array devices are described. One embodiment of a haptic array device includes a plurality of cells, wherein each cell includes a base element and an array of ultrasonic transducer elements, and wherein each base element is configured for independent control. The haptic array device also includes a support structure for the plurality of cells, wherein the support structure is configured to independently position each of the plurality of cells. The haptic array device also includes a controller configured to control output of at least one of the plurality of cells, wherein the controller controls a focus point and a direction of ultrasonic output for each of the plurality of cells.

In one embodiment, the base element of each cell is a concave structure, and wherein the array of ultrasonic transducer elements of each cell are located on an inner surface of the concave structure.

In one embodiment, each cell includes a deformable structure controlled to direct output direction and control a focus point of ultrasonic transducer elements.

In one embodiment, the support structure includes a robotic structure for independent control of each of the plurality of cells, wherein each robotic structure is configured to control output of a cell.

In one embodiment, the support structure arranges each of the plurality of cells in at least one of a convex, flat and concave position.

In one embodiment, the controller activates at least one ultrasonic transducer element of each cell to generate ultrasonic output including at least one focus point.

In one embodiment, the controller adjusts at least one of focus point distance and focus point direction by controlling a shape of the support structure for at least one of the plurality of cells.

In one embodiment, the controller adjusts a focus point of at least one cell from a first height to a second height.

In one embodiment, the controller controls at least one first cell to generate a first focus point, and controls at least one second cell to generate a second focus point, wherein the at least one first cell and at least one second cell are controlled to generate a haptic motion sensation output.

In one embodiment, the controller controls output to generate a haptic notification for a vehicle interface, wherein the focus point and the direction of ultrasonic output for each of the plurality of cells is controlled relative to a vehicle interface surface.

In another embodiment, a vehicle user interface includes a user interface surface, and a haptic array device integrated with the user interface surface. The haptic array device comprising a plurality of cells, wherein each cell includes a base element and an array of ultrasonic transducer elements, and wherein each base element is configured for independent control. The haptic array device also includes a support structure for the plurality of cells, wherein the support structure is configured to independently position each of the plurality of cells. The haptic array device also includes a controller configured to control output of at least one of the plurality of cells relative to the user interface surface, wherein the controller controls a focus point and a direction of ultrasonic output for each of the plurality of cells.

In one embodiment, the base element of each cell is a concave structure, and wherein the array ultrasonic transducer elements of each cell are located on an inner surface of the concave structure.

In one embodiment, the support structure includes a robotic structure for independent control of each of the plurality of cells, wherein each robotic structure is configured to control output direction and control a focus point of ultrasonic transducer elements.

In one embodiment, the support structure arranges each of the plurality of cells in at least one of a convex, flat and concave position.

In one embodiment, the controller adjusts a focus point of at least one cell from a first height to a second height.

In one embodiment, the controller controls at least one first cell to generate a first focus point, and control at least one second cell to generate a second focus point, wherein the at least one first cell and at least one second cell are controlled to generate a haptic motion sensation output.

In yet another embodiment, a method for controlling a haptic array device includes receiving, by a controller, a command for a plurality of cells, wherein each cell includes a base element and an array of ultrasonic transducer elements, and wherein each base element is configured for independent control. The method for controlling a haptic array device also includes controlling, by the controller, output of at least one first cell of the plurality of cells, wherein the controller controls a focus point and a direction of ultrasonic output of the at least one cell. The method for controlling a haptic array device also includes updating, by the controller, output of the plurality of cells.

In one embodiment, the controller updates output of the at least one first cell by adjusting at least one of focus point distance and focus point direction by controlling shape of a support structure for at least one of the plurality of cells.

In one embodiment, the controller updates output of the at least one first cell by adjusting a focus point of at least one cell from a first height to a second height.

In one embodiment, the controller updates output of the at least one first cell by controlling at least one second cell to generate a second focus point, wherein the at least one first cell and at least one second cell are controlled to generate a haptic motion sensation output.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIGS. 5A-5D depict a graphical representation of a process for controlling a haptic array device, according to embodiments described herein;

DETAILED DESCRIPTION

Conventional haptic devices often generate parasitic output including unintentional output points. In addition, conventional haptic array devices often generate weak output. Solutions are described herein for a haptic array device including a plurality of controllable cells. The cells of the haptic array device include structures that are controlled to generate focus points with control of each cell to control focus point height and direction. Some embodiments include processes for providing a haptic output. Embodiments are capable of providing a focus point, or focal point, with variable height to produce output indicative of continuous movement in a plane (e.g., XY plane) for mid-air haptic effects. Embodiments also allow for a base of each cell to conclude at least a curved geometry to produce a more intense focus points.

By combining geometry of cells, making use of haptic illusions and incorporating controllable cell base and/or cell support (e.g., soft robotics, etc.), the system may be more efficient than the currently available haptic devices. The systems and methods for haptic array devices incorporating the same will be described in more detail, below.

Figure 1A:
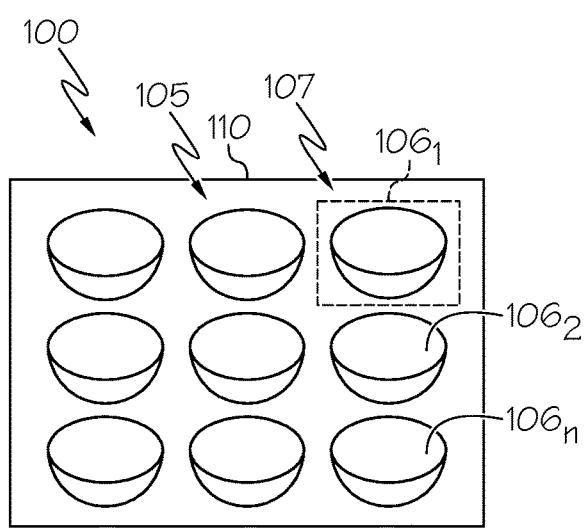
FIG. 1A depicts a haptic array device, according to embodiments described herein.

Referring now to the drawings, FIG. 1A depicts an example haptic array device 100 according one or more embodiments. The haptic arrays described herein relate to an ultrasonic tactile arrays configured to generate mid-air haptic sensations with high efficiency. Haptic array device 100 may be configured to provide an optimal geometry to provide haptic output (e.g., sensations, illusions, etc.) and incorporate one or more elements to control focus eight and direction (e.g., soft robotics, etc.).

Haptic array device 100 provides a configuration to provide efficient and improved output compared to currently available commercial devices. Haptic array device 100 may be configured to provide haptic output, such as ultrasonic output relating to sense of touch. Haptic output as used herein may relate to perception and/or manipulation of objects using the senses of touch and proprioception.

As shown in FIG. 1A, haptic array device 100 includes an array of cells 105 including a plurality of cells, such as cells $106_{1-n}$, and support structure 110. In embodiments of the present disclosure, each of the arrays of cells 105 includes a base element and an array of ultrasonic transducer elements, which are described in more detail below with respect to FIG. 1B. A controller of haptic array 100 may be configured to independently control at least one of support structure 110 and a base element of each cell for independent control of transducer elements. Haptic array device 100 includes support structure 110 configured to independently position each of the plurality of cells. Haptic array device 100 may also include a controller (not shown in FIG. 1A) configured to control output of at least one of array of cells 105. The controller may be configured to control a focus point and a direction of ultrasonic output for each of the array of cells 105. FIG. 1A also identifies a portion 107 of haptic array 100 which is shown in more detail in FIG. 1B.

Haptic array 100 may be configured to activate at least one cell to output ultrasonic output. The ultrasonic output may be sensed by a user. In embodiments, output is generated to deliver at one focus point to provide a haptic sensation. Haptic sensations may relate to a feeling of touch or wind due to ultrasonic energy, even though the haptic array does not need to contact the user. By utilizing a collection of cells, and in particular cells as described herein, a plurality of focal points may be provided at different heights. The array of cells may be controlled to provide different outputs, such that at least one first cell may be controlled for a first output configuration and at least one second cell may be configured to output at least one second configuration. In addition to focus point height and direction, timing of cells may be controlled to output a haptic sensation of motion in one or more directions. In addition, one or more cells may be controlled and/or actuated for haptic output while adjusting base element 108 and/or support 110 to control direction.

Haptic array 100 may produce an ultrasonic tactile array capable of generating mid-air haptic sensations with high efficiency. By combining geometry of cells 105, making use of haptic illusions and incorporating controllable support (e.g., soft robotics, etc.), the system may be more efficient than the currently available haptic devices.

Figure 1B:
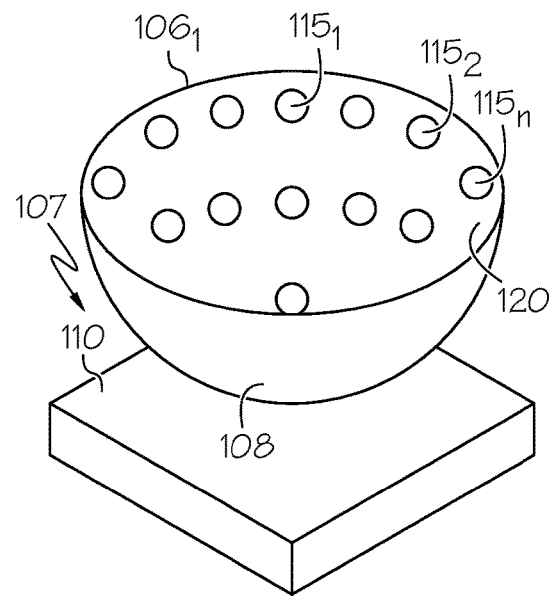
FIG. 1B depicts a cell of haptic array device with a concave configuration, according to embodiments described herein.

FIG. 1B depicts a cell of haptic array device 100 according to one or more embodiments. Portion 107 includes cell $106_1$, which is one of the cells of the array of cells 105 of FIG. 1A, and shows a portion of support structure 110. Each cell, such as cell $106_1$, includes a plurality of transducer elements transducer elements $115_{1-n}$. Transducer elements $115_{1-n}$ may relate to individual ultrasonic transducers that may be activated to generate an ultrasonic output. One or more transducers may be activated for a cell. As a non-limiting example, haptic array 100 may include a matrix of 16×16 piezoelectric transducers for each cell, such as cells $106_{1-n}$, the transducers configured to operate together to create a focal point mid-air. Focal point location may be controlled for each cell relative to the array surface in the XYZ plane.

Each cell, such as cell $106_1$, includes a base element 108 which may be configured to retain and support transducer elements $115_{1-n}$. Base element 108 may be a deformable structural element have a concave or bowl structure. Transducer elements $115_{1-n}$ may be located (e.g., supported) on an inner surface 120 of base element 108, such as the concave surface. Accordingly, cell $106_1$ may include an array of ultrasonic transducer elements $115_{1-n}$, on a surface of base element 108. Base element 108 may arrange transducer elements $115_{1-}$ to emit ultrasonic output in a particular direction and for at least one focal height. By providing base element 108 with a concave structure (e.g., bowl shaped), the mid-air haptic response may be improved relative to use of a single transducer element. In addition, one or more elements of a cell can control intensity to create focal points of different heights using one or more transducer elements $115_{1-n}$. FIG. 1B illustrates a configuration that generates stronger sensations while complying with safety constraints.

At least one of cell $106_1$ and/or support 110 may include material to enable reconfiguration of the cell. By way of example, at least one of a base element 108 and support structure 110 may include a deformable material or structure, such as a soft-robotic structure. Exemplary embodiments of deformable materials and soft-robotic structures can include Liquid Crystal Elastomers (LCE), Shape-memory alloys, E-rubbers, electroactive polymers and magnetic shape-memory alloys, etc. Materials can provide changes in shape and volume when stimulated with light, electricity and/or temperature. Material of cell $106_1$ and/or support 110 may be controlled to orient or direct ultrasonic output in one or more directions. Orientation and the output configuration of each cell of array 105 may be based on a control signal applied to a deformable structure to control output direction and control a focus point of ultrasonic transducer as described below with reference to FIGS. 6 and 7. Each cell 106 may be controlled to generate at least one focal point at a fixed location in a plane above haptic array 100 (e.g., XY plane). In some embodiments the shape of base element 108 may be controlled to adjust at least one of direction (e.g., angle of output) and focus point height based on one or more control signals received from a controller. In addition, the array of cells 105 may include a much smaller scale by using multiple transducers for each cell 106.

Support 110 may also include a soft robotic structure for independent control of each of the plurality of cells in some embodiments. For example, support 110 may include individual sections associated with one or more cells, wherein a soft robotic structure of support 110 may be controlled to modify at least one of base deformation and output direction to control output of a cell. Embodiments as described herein may include a hybrid geometry for at least base element 108 and support structure 110 and soft robotics or other deformable and controllable material for human machine interface (HMI) applications. As will be described in more detail below, at least one of base element 108 and support structure 110 may be configured to arrange cells 105 in at least one of a convex, flat and concave position.

Figure 1C:
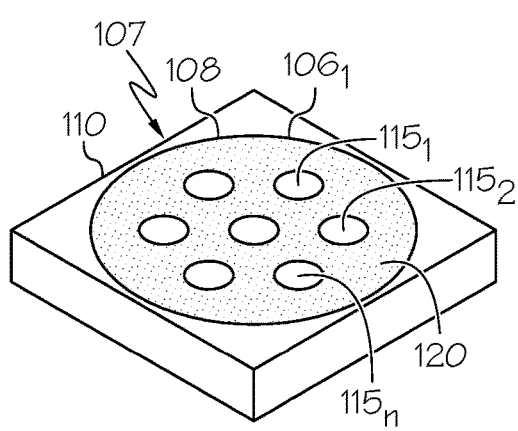
FIG. 1C depicts a cell of haptic array device with a flat configuration, according to embodiments described herein.
Figure 1D:
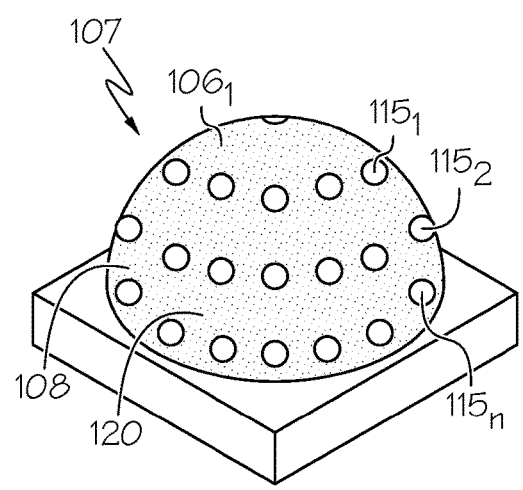
FIG. 1D depicts a cell of haptic array device with a convex configuration, according to embodiments described herein.

FIG. 1C illustrates cell $106_1$ with base element 108 in a flat configuration. Base element 108, may include a material and a structural configuration controlled to modify its structure such that surface 120 is modified from curved (in FIG. 1B) to flat. FIG. 1D illustrates cell $106_1$ with base element 108 in a convex configuration. Base element 108, may include a material and a structural configuration controlled to modify its structure such that surface 120 is modified from curved (in FIG. 1C) to the convex configuration of FIG. 1D. Materials of base element 108 may be controlled based on a control signal provided by a controller to one or more preset configurations. The whole structure of base element 108 may be controlled to change from concave to flat (e.g., planar) to convex, or any other intermediate shape. Control of the material may include stimulation by light, electricity and/or temperature.

Figure 2:
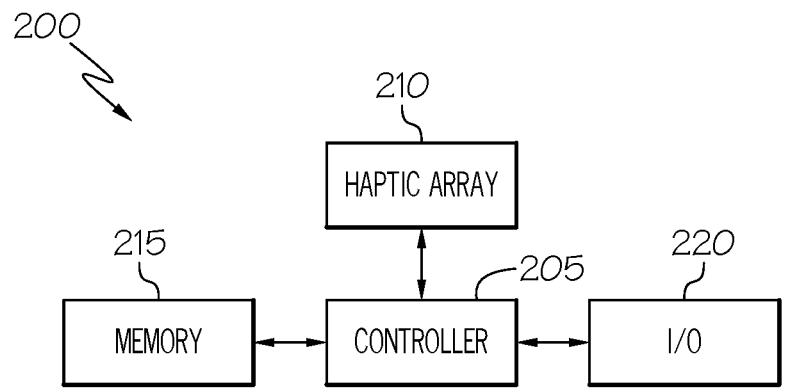
FIG. 2 depicts a graphical representation of a haptic array device, according to embodiments described herein.

FIG. 2 depicts a graphical representation of a haptic array device 200, according to embodiments described herein. The example device 200 includes controller 205, haptic array 210, memory 215 and input/output block 220. Device 200 may relate to a haptic array device (e.g., array device 100) wherein haptic array 210 includes an array of cells (array of cells 105) and a support structure (e.g., support structure 110).

Controller 205 may be a processor or any device configured to execute one or more operations stored in memory 215, such as processes for a haptic array. Controller 205 may be coupled to memory 215, I/O 220 and haptic array 210. Controller 205 may be configured to control activation of haptic array based on one or more inputs from I/O block 220.

Controller 205 is configured to control at least one of the base 108 of a cell 106 or the support 110 to adjust a focus point of at least one cell from a first height to a second height. As discussed in more detail below, controller 205 may cause the base 108 of a cell 106 and/or the support to deform and/or control activation of one or more transducers of a cell to control a focus point height.

Controller 205 may be configured to control one or more cells for one or more time periods. In one embodiment, controller 205 is configured to control at least one first cell (e.g., cell $106_1$) to generate a first focus point, and control at least one second cell (e.g., cell $106_2$) to generate a second focus point. The at least one first cell and at least one second cell are controlled to generate a haptic motion sensation output, such as a mid-air tactile stimulation generated in the palm of user's hand.

Controller 205 may be configured to activate cells of a haptic array to provide multiple output configurations. For example, controller 205 may be configured to activate at least one ultrasonic transducer element of each cell to generate ultrasonic output including at least one focus point. Controller 205 may also be configured to adjust at least one of focus point distance and focus point direction by controlling the shape of a support structure (e.g., support structure 110) for at least one of the array of cells 105. Controller 205 may be configured to control output to generate a haptic notification for a vehicle interface, wherein the focus point and the direction of ultrasonic output for each of the plurality of cells is controlled relative to a vehicle interface.

Figure 3:
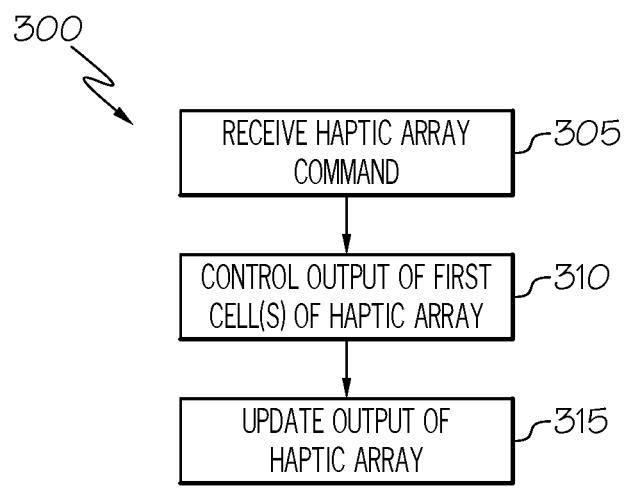
FIG. 3 depicts a process for controlling a haptic array device, according to embodiments described herein.

FIG. 3 depicts a process for controlling a haptic array device according to one or more embodiments. Process 300 may be performed by a haptic array device (e.g., haptic array device 100) and/or devices as described herein (e.g., haptic array device 100).

Process 300 may be initiated by receiving a haptic array command at block 305. A controller (e.g., controller 205Q) of a haptic array device (e.g., haptic array device 200) may receive a command to generate a haptic output as part of a user interface, such as a vehicle user interface. For example, the haptic output may be based on operations of a vehicle user interface to provide a user with one or more haptic sensations associated with the user interface. Operation of the process 300 may not require user interaction for the output to be generated. The haptic array command may be an indication that a vehicle user interface is activated and/or operating. One or more different commands may be generated while a user interface, such as a vehicle user interface is operating. According to one embodiment, process 300 may be performed in association with display operations of a vehicle, such that a portion of the vehicle user interface generate a haptic command as part of the user interface features for one or more of control of a vehicle, control of a media interface, control of a communication function, and vehicle operations in general.

A controller (e.g., controller 205) controls output of at least a first cell of a haptic array at block 310. For certain operations, the controller may activate every cell of a haptic array. By way of example, a shot pulse may be generated by each cell to indicate initiation of the device. Process 300 may continue to activate the haptic array device based on a first setting at block 310 for at least a first period of time. At block 315, the control may update output of the haptic array. Updating the haptic array can include activation of at least one additional or different cell based on haptic output to be desired. In certain embodiments, the haptic output may include progressive activation of cells in a direction to indicate movement, such as movement of an element associated with the user interface. According to another embodiment, one or more patterns may be output for cells of the haptic array device.

According to one embodiment, a controller may update output of the at least one first cell at block 315 by adjusting at least one of focus point distance and focus point direction by controlling shape of a support structure for at least one of the plurality of cells. The controller may also update output of the at least one first cell by adjusting a focus point of at least one cell from a first height to a second height at block 315. The controller may also update output of the at least one first cell by controlling at least one second cell to generate a second focus point, wherein the at least one first cell and at least one second cell are controlled to generate a haptic motion sensation at block 315. Process 300 may continue to update cells following block 315.

Figure 4:
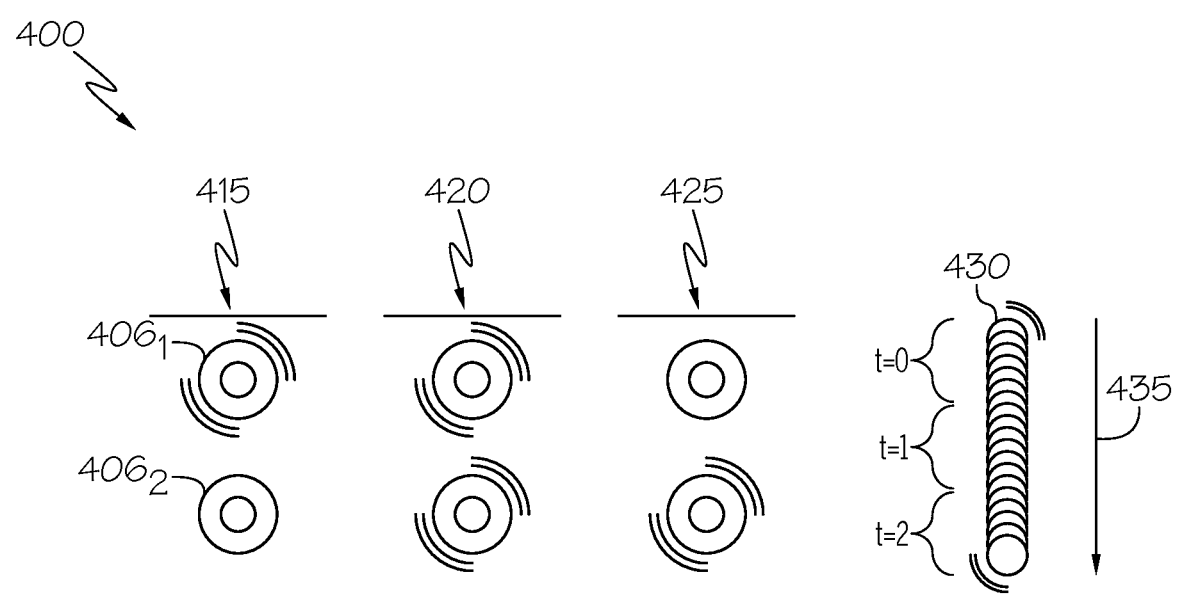
FIG. 4 depicts a graphical representation of a process for controlling a haptic array device, according to embodiments described herein.

FIG. 4 depicts a graphical representation of a process for controlling a haptic array device according to one or more embodiments. Process 400 illustrates activation of at least a first cell, such as cell $406_1$, and of at least a second cell, cell $406_2$, during time intervals 415-425. Cells $406_1$ and $406_2$ may relate to cells of a haptic array element (haptic array element 100) as described herein. The output of cells may be controlled to generate a haptic output that provides a sensation of motion. Process 400 includes activating cell $406_1$ for at least a first time period, such a time interval 415. According to one embodiment, process 400 updates cell activation such that cells $406_1$ and $406_2$ are activated during time interval 420. During time interval 425, cell $406_2$ continues to be activated and cell $406_1$ is turned off. The resulting haptic output 430 includes a sensation of motion in a direction 435. Output 430 may relate to motion in the XY plane. As discussed herein activation of cells $406_1$ and $406_2$ during time intervals 415-425 may include updating of focus height and focus direction.

Process 400 may generate the sensation of a moving dot on the surface of a user's skin, such as the palm of the user's hand. Output 430 may relate to a haptic illusion wherein vibration of transducers (e.g., actuators) in each cell can detected by human skin to generate specific illusions. Under general conditions, once cells are activated, a user simply feels each cell being turned on/off. However, when the actuators are programmed to turn ON with the correct time delay, a user can instead feel a continuous motion starting from the first cell, moving all the way to the second cell. This illusion is known as continuous motion.

By making use vibro-tactile illusions, proposed embodiments can convey a sense of motion to users. In this case, each cell from the array generates one static focal point, which can stimulate the human skin like an actuator. When these focal points are controlled with the correct timing, a sensation of perceived motion can be generated in the user, even if the focal point itself is not moving in the skin.

FIGS. 5A-5D depict a graphical representation of a process for controlling a haptic array device according to one or more embodiments. Process 500 illustrates haptic output. Process 500 illustrates an array structure acting on human skin, a user's hand 510 and to illustrate illusion felt on the skin with this movement.

Process 500 illustrates activation of at least a first cell, such as cell $506_1$, to generate focus point 520 followed by activation of at least a second cell, cell $506_1$, during time intervals 501-503. Cells $506_{1-n}$ may relate to cells of a haptic array element (haptic array element 100) as described herein. According to one embodiment, output of cells may be controlled to generate a haptic output, such as a sensation of motion. Haptic array device 505 includes a plurality cells $506_{1-n}$ configured to output ultrasonic output relative to a surface, such as a vehicle user interface surface 515.

Process 500 includes activating cell $506_1$ for at least a first time period, such a time interval 501. Process 500 updates cell activation such that cells $506_1$ and $506_3$ are activated during time interval 502. During time interval 503, cell $506_3$ continues to be activated to generate focus point 525 and cell $506_1$ is deactivated. The resulting haptic output 530 includes a sensation of motion 535 in a direction 540. Output 535 may relate to motion in the XYZ plane. As discussed herein activation of cells $506_{1-n}$ during time intervals 501-503 may include updating of focus height and focus direction. According to one embodiment, output of cell $506_1$ may be modified during timer interval 502 to update at least one or direction and focus height. FIG. 5B illustrates an exemplary location 521 of a focus height with a modified direction which may be generated by cell $506_1$ based on control of direction due to a cell base and/or support. FIG. 5B illustrates cell $506_3$ having a focus height of greater distance relative to vehicle user interface surface 515 than output 520 of cell $506_1$.

A haptic array device as described herein, such as haptic array device 100 and haptic array device 505, and processes for control of a haptic array devices may be part of a vehicle user interface. In one embodiment, haptic array device 505 is integrated with a user interface surface, such as a vehicle user interface surface 515.

Figure 6A:
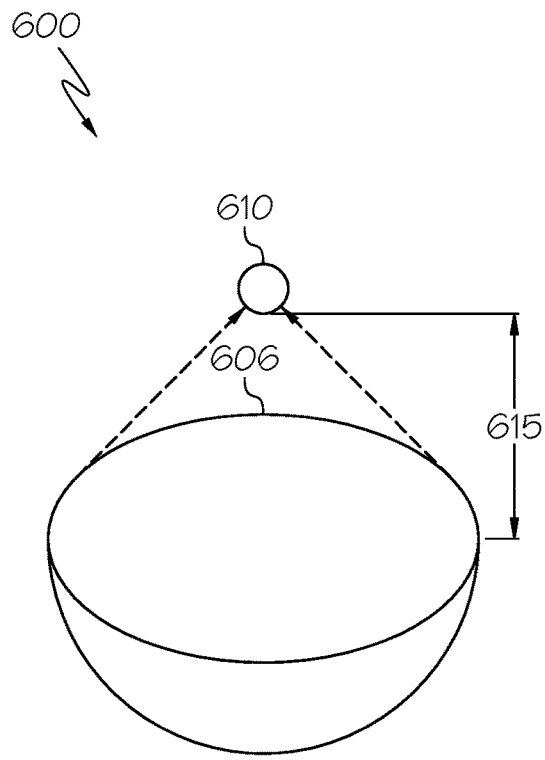
FIGS. 6A-6B depict a graphical representation of controlling focus point height, according to embodiments described herein.
Figure 6B:
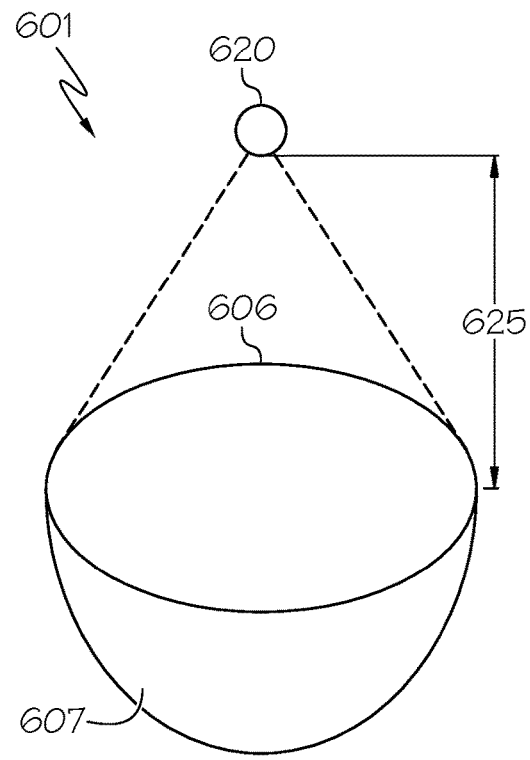

FIGS. 6A-6B depict a graphical representation of controlling focus point height according to one or more embodiments. Cells of a haptic array device described herein may be configured to control and modify output height of a focus point. Height (e.g., Z axis) in which the focal points are produced is determined by the positioning of the transducers inside a curved structure, or base of each cell. When the curvature is modified and/or the angle of incidence of the transducers is modified, the focal point will be produced at a different location.

FIG. 6A illustrates cell 606 in a first configuration 600 which can generate focus point 610 at a distance 615. By modifying the base of cell 606, a configuration 601, shown in FIG. 6B, may be provided where cell 606 has base 607 modified to generate focus point 620 at a distance 625 from the cell. Distance 620 being greater than distance 610. As such, a cell can create different focus points, and the cell shape may control height and intensity of ultrasonic output. First configuration 600 may relate to cell 606 in a resting state, and the focal point is formed at height, and configuration 601 may relate to cell 606 in an excited state, and the focal point is formed at a second height. Focus point heights in FIGS. 6A-6B are exemplary and cells maybe controlled to multiple focus heights. Cell 606 may be deformable in multiple degrees of freedom to produce fine adjustments in the focal point height whenever necessary. Additionally, the whole cell surface can be composed of soft material, such as a softs robotics material to add flexibility for the system and enable operation for cell curvature to change over time.

Figure 7A:
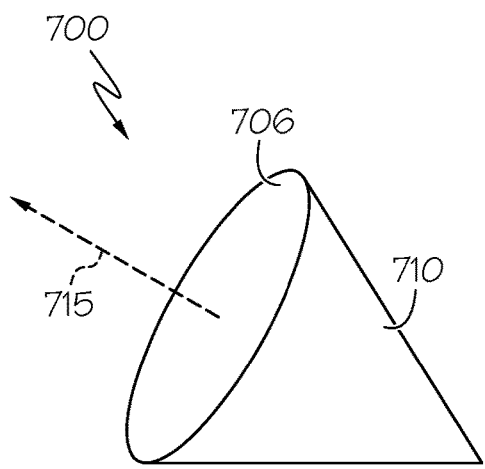
FIGS. 7A-7B depict a graphical representation of controlling focus point direction, according to embodiments described herein.
Figure 7B:
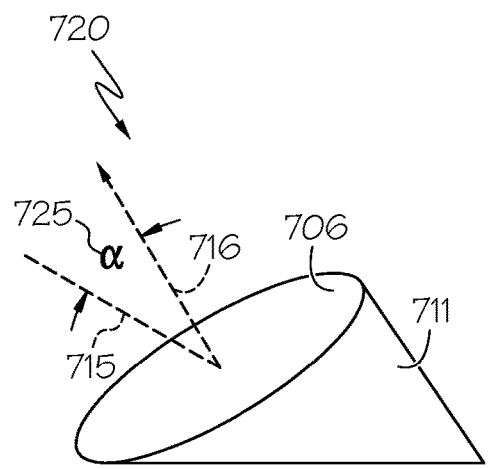

FIGS. 7A-7B depict a graphical representation of controlling focus point direction according to one or more embodiments. Cells of a haptic array device described herein may be configured to control and modify output direction of a focus point. The angle (e.g., a) in which the focal point is directed may be produced and/or modified by positioning the base of each cell. When the base shape is modified, the focal point can be angularly displaced. FIG. 7A illustrates cell 706 in a first configuration 700 which can generate a focus point in direction 715 based on configuration 710. Modifying the output direction may be based on providing at least one of a cell base and support structure with a deformable structure (e.g., soft robotic structure) to change the direction of ultrasound produced by the transducer. First configuration 700 may relate to a resting state. According to one embodiment, by modifying the configuration of the base of cell 706, a configuration 720 may be provided where cell 720 has base 711 modified to generate a focus point in direction 716 with an angular displacement of 725. As such, a cell can create different focus points, and the cell shape may control direction of ultrasonic output. Configuration 720 of FIG. 7B may relate to cell 705 in an excited state, causing a deformation and modifying the position of the transducer. As a result, the ultrasound trajectory is changed by an angle α, shown as 725.

As illustrated above, various embodiments for haptic array devices and processes for providing haptic output are disclosed. Embodiments provide structures that allow for modifying at least one of focus point height and direction. Embodiments provide configurations that provide a tactile sensation of improved strength. Processes and device configurations are also provided that do not generate parasitic outputs.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for haptic array devices. It should also be understood that these embodiments are merely exemplary and are not intended to limit the scope of this disclosure.

The invention claimed is:

1. A haptic array device comprising:
 a plurality of cells, wherein each cell includes a base element and an array of ultrasonic transducer elements, and wherein each base element is configured for independent control of each cell to control ultrasonic output of each cell individually;
 a support structure for the plurality of cells, wherein the support structure is configured to independently position each of the plurality of cells; and
 a controller configured to control output of at least one of the plurality of cells, wherein the controller is configured to activate at least one of the ultrasonic transducer elements of each cell, based on movement of a body element associated with a user, to control a focus point and a direction of ultrasonic output for each of the plurality of cells, and wherein the controller adjusts at least one of focus point distance and focus point direction by controlling a shape and volume of the support structure for at least one of the plurality of cells.

2. The haptic array device of claim 1, wherein the base element of each cell is a concave structure, and wherein the array of ultrasonic transducer elements of each cell are located on an inner surface of the concave structure.

3. The haptic array device of claim 1, wherein each cell includes a deformable structure controlled to direct output direction and control a focus point of ultrasonic transducer element.

4. The haptic array device of claim 1, wherein the support structure includes a robotic structure for independent control of each of the plurality of cells, wherein each robotic structure is configured to control output of a cell.

5. The haptic array device of claim 1, wherein the support structure arranges each of the plurality of cells in at least one of a convex, flat and concave position.

6. The haptic array device of claim 1, wherein the controller activates at least one ultrasonic transducer element of each cell to generate ultrasonic output including at least one focus point.

7. The haptic array device of claim 1, wherein the controller adjusts a focus point of at least one cell from a first height to a second height.

8. The haptic array device of claim 1, wherein the controller controls at least one first cell to generate a first focus point, and controls at least one second cell to generate a second focus point, wherein the at least one first cell and at least one second cell are controlled to generate a haptic motion sensation output.

9. The haptic array device of claim 1, wherein the controller controls output to generate a haptic notification for a vehicle interface, wherein the focus point and the direction of ultrasonic output for each of the plurality of cells is controlled relative to a vehicle interface surface.

10. A vehicle user interface comprising:
 a user interface surface; and
 a haptic array device integrated with the user interface surface, the haptic array device comprising:

a plurality of cells, wherein each cell includes a base element and an array of ultrasonic transducer elements, and wherein each base element is configured for independent control;

a support structure for the plurality of cells, wherein the support structure is configured to independently position each of the plurality of cells, wherein the support structure arranges each of the plurality of cells in a convex position; and a controller configured to control output of at least one of the plurality of cells, wherein the controller is configured to activate at least one of the ultrasonic transducer elements of each cell, based on movement of a body element associated with a user, to control a focus point and a direction of ultrasonic output for each of the plurality of cells, and wherein the controller adjusts at least one of focus point distance and focus point direction by controlling a shape and volume of the support structure for at least one of the plurality of cells.

11. The vehicle user interface of claim 10, wherein the base element of each cell is a concave structure, and wherein the array of ultrasonic transducer elements of each cell are located on an inner surface of the concave structure.

12. The vehicle user interface of claim 10, wherein the support structure includes a robotic structure for independent control of each of the plurality of cells, wherein each robotic structure controls output direction and controls a focus point of ultrasonic transducer elements.

13. The vehicle user interface of claim 10, wherein the controller adjusts a focus point of at least one cell from a first height to a second height.

14. The vehicle user interface of claim 10, wherein the controller controls at least one first cell to generate a first focus point, and controls at least one second cell to generate a second focus point, wherein the at least one first cell and at least one second cell are controlled to generate a haptic motion sensation output.

15. A method for controlling a haptic array device, the method comprising:

receiving, by a controller, a command for a plurality of cells, wherein each cell includes a base element and an array of ultrasonic transducer elements, and wherein each base element is configured for independent control of each cell to control the ultrasonic output of each cell individually;

controlling, by the controller, output of at least one first cell of the plurality of cells, wherein the controller is configured to activate at least one of the ultrasonic transducer elements of the at least one cell, based on movement of a body element associated with a user, to control a focus point and a direction of ultrasonic output of the at least one first cell; and updating, by the controller, output of the plurality of cells, wherein the controller updates output of the at least one first cell by adjusting at least one of focus point distance and focus point direction by controlling shape and volume of a support structure for at least one of the plurality of cells.

16. The method of claim 15, wherein the controller updates output of the at least one first cell by adjusting a focus point of at least one cell from a first height to a second height.

17. The method of claim 15, wherein the controller updates output of the at least one first cell by controlling at least one second cell to generate a second focus point, wherein the at least one first cell and at least one second cell are controlled to generate a haptic motion sensation output.

* * * * *